United States Patent [19]
Holt

[11] Patent Number: 5,417,470
[45] Date of Patent: May 23, 1995

[54] STRUCTURAL MODULE FOR VEHICLE DOOR

[75] Inventor: Larry Holt, Sandford, Canada

[73] Assignee: Multimatic Inc., Markham, Canada

[21] Appl. No.: 825,515

[22] Filed: Jan. 24, 1992

[30] Foreign Application Priority Data

Jan. 25, 1991 [CA] Canada ............................ 2034937

[51] Int. Cl.6 .............................. B60J 5/04
[52] U.S. Cl. .................. 296/188; 296/146.6
[58] Field of Search .............. 296/188, 189, 146.6

[56] References Cited

U.S. PATENT DOCUMENTS

| | | |
|---|---|---|
| 3,791,693 | 2/1974 | Hellriegel et al. . |
| 3,868,141 | 2/1975 | Johnson ............... 296/146 CX |
| 3,907,358 | 9/1975 | Barenyi et al. ........... 296/146 C |
| 4,013,317 | 3/1977 | Reidelbach et al. ....... 296/146 C |
| 4,416,088 | 11/1983 | Feucht et al. . |
| 4,434,580 | 3/1984 | Engelsberger et al. . |
| 4,451,077 | 5/1984 | Bruhnke et al. . |
| 4,488,751 | 12/1984 | Kling . |
| 4,662,115 | 5/1987 | Ohya et al. . |
| 4,684,166 | 8/1987 | Kanodia ............... 296/188 X |
| 4,704,822 | 11/1987 | Srock et al. . |
| 4,708,390 | 11/1987 | Palentyn et al. . |
| 4,743,062 | 5/1988 | McLaren et al. . |
| 4,785,585 | 11/1988 | Grier et al. . |
| 4,794,734 | 1/1989 | Stempien . |
| 4,796,948 | 1/1989 | Wilson et al. ............ 296/146.6 |
| 4,800,638 | 1/1989 | Herringshaw et al. . |
| 4,827,671 | 5/1989 | Herringshaw et al. . |
| 4,831,710 | 5/1989 | Katoh et al. . |
| 4,838,606 | 6/1989 | Furubayashi et al. . |
| 4,845,894 | 7/1989 | Herringshaw et al. . |
| 4,850,636 | 7/1989 | McLaren et al. . |
| 4,866,883 | 9/1989 | Brown et al. ............ 296/188 X |
| 4,876,825 | 10/1989 | Widrig et al. . |
| 4,919,473 | 4/1990 | Laimighofer et al. . |
| 4,924,630 | 5/1990 | Lomasney et al. . |
| 4,945,682 | 8/1990 | Altman et al. . |
| 4,974,365 | 12/1990 | Ono . |
| 5,033,236 | 7/1991 | Szerdahelyi et al. ........ 296/188 X |
| 5,039,160 | 8/1991 | Garnweidner et al. ..... 296/146.6 X |

FOREIGN PATENT DOCUMENTS

| | | |
|---|---|---|
| 1164504 | 3/1984 | Canada . |
| 1241042 | 8/1988 | Canada . |
| 1273975 | 9/1990 | Canada . |
| 2574029 | 6/1986 | France . |
| 2607077 | 5/1988 | France . |
| 3209052 | 9/1983 | Germany . |
| 3402135 | 9/1985 | Germany . |
| 1391780 | 4/1975 | United Kingdom ............ 296/146 C |

Primary Examiner—Joseph H. Pape
Attorney, Agent, or Firm—Ivor M. Hughes; Neil H. Hughes

[57] ABSTRACT

A structural module (hardware cassette) is provided suitable for use in the assembly of a vehicle door. The module includes a latch mounting member, a pair of door hinge assembly components (a lower door hinge component and an upper door hinge component) vertically spaced from one another when mounted in a vehicle, and tubes connecting the hinge components to the latch mounting member, one tube being connecting the upper hinge to the latch mounting member and extending substantially from the upper hinge component to the latch mounting member when mounted in the vehicle and a pair of laterally spaced tubes connecting the lower hinge component and the latch mounting member.

53 Claims, 12 Drawing Sheets

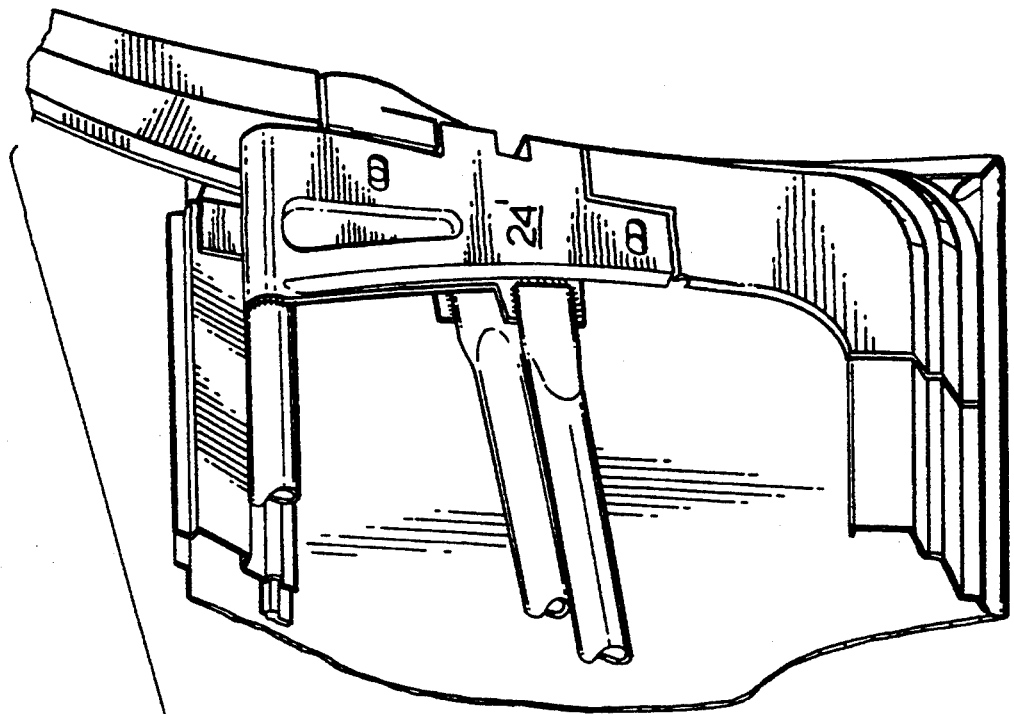
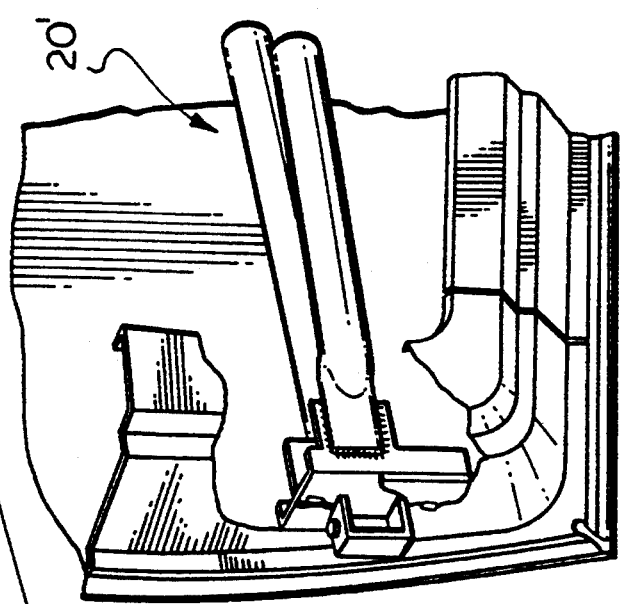
FIG. 7.

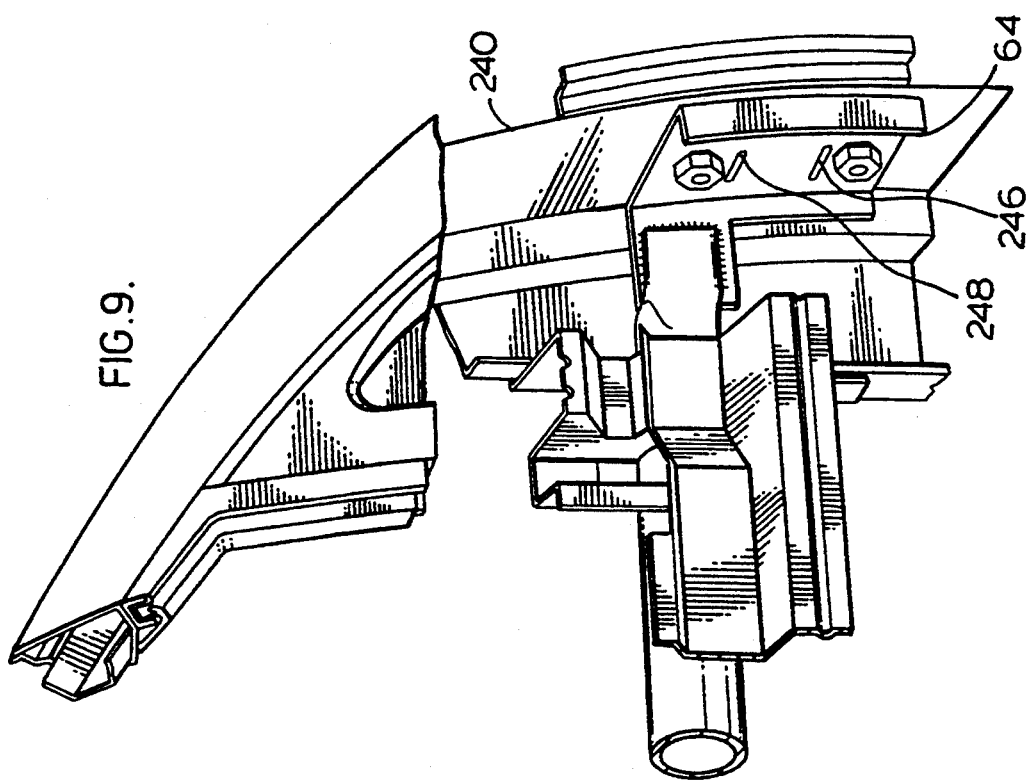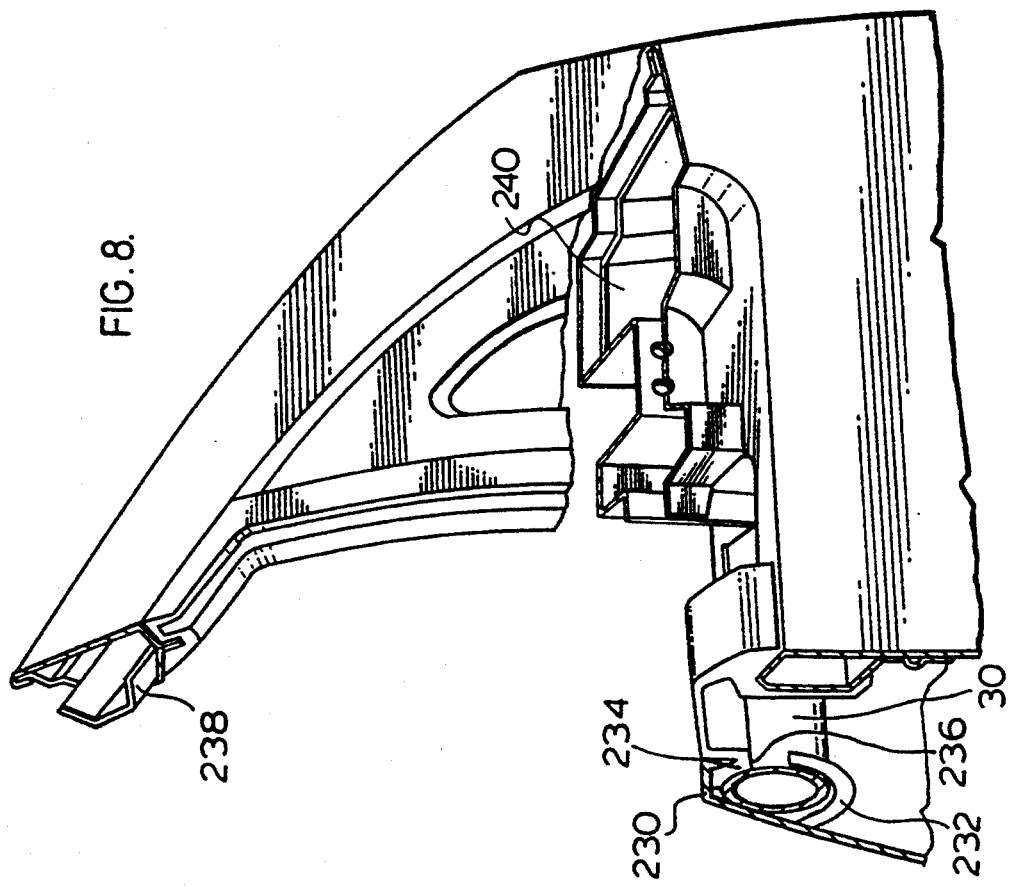

FIG.11a.
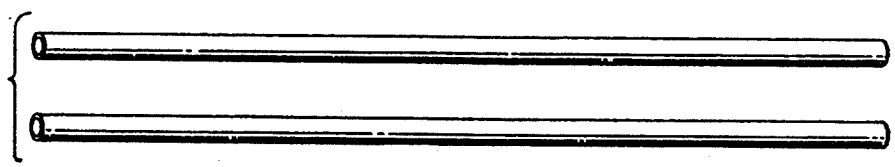
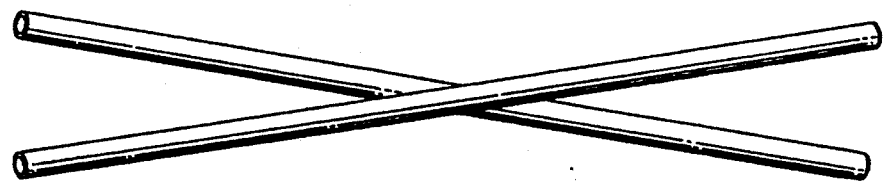
FIG.11d.
FIG.11b.
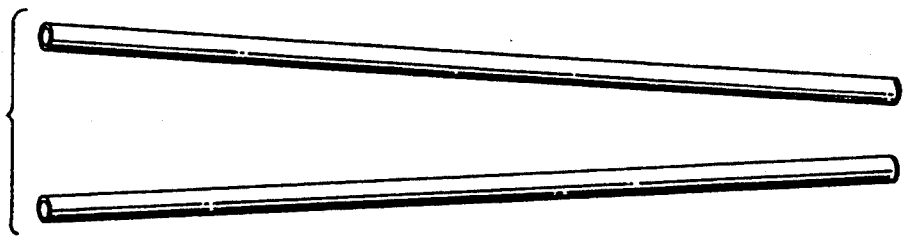
FIG.11e.
FIG.11c.
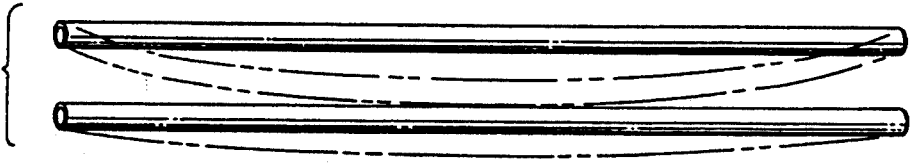
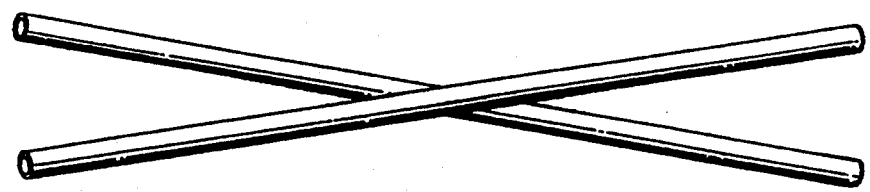
FIG.11f.

STRUCTURAL MODULE FOR VEHICLE DOOR

FIELD OF THE INVENTION

This invention relates to structural modules for doors suitable for mounting in vehicles and particularly to structural modules (hardware cassettes) for carrying the load of the door while providing protection from side impacts.

BACKGROUND OF THE INVENTION

Side doors of vehicles comprise inner and outer door panels and the hardware accessories secured between the panels. More recently, intrusion beams have been positioned between the panels to offer protection from side impacts. Also more recently a modular approach has been taken with respect to the assembly of the door. In a joint proposal by the Budd Company Stamping and Frame Division and ITT Automotive a modular door hardware plate assembly was proposed which is pre-assembled with the hardware and pre-tested before assembly into the door. The heart of the modular assembly proposal is a stamped module plate which purportedly locates and supports all internal door hardware. The stamped plated assembly with components is then assembled to the door. The plate alone, however, is not sufficient to provide protection from side impact.

Another proposal was made jointly by Bayer AG and Dynamit Nobel AG of Germany. The basic features of the modular composite door prototype were an inner steel skeleton structure encapsulated within a polyurethane, and an outer panel made of polyurea.

The skeleton of the inner panel was proposed to be a welded steel frame made of rolled sections and stampings. The skeleton is attached on one side to a hinge plate and on the other to the housing for the latch mechanism. Bent cross-members extend from one side of the skeleton proximate the housing for the latch mechanism to the other side of the skeleton. Braces secure the cross-members. The skeleton does not however provide the primary side impact protection.

It is therefore an object of this invention to provide a structural module for a vehicle door capable of carrying the load of the door, preclude sag, and afford protection to passengers riding in a vehicle from side impact.

Federal Motor Vehicle Safety Standard No. 571.214 specifies door strength requirements which minimize the safety hazard caused by intrusion into the passenger compartment in a side impact accident. This standard specifies 2250 lbs (10000N) as the initial crush resistance for a side door. The initial crush resistance is defined as the average force required to deform the door over the initial 6" (150 mm) of the crush. This crush test is performed by a vertical cylindrical intruder. The load versus displacement curve is plotted while a quasistatic load is applied to the door by the intruder in an inboard direction until the intruder travels 6". The integral of the applied load with respect to the crush distance for 0" to 6" divided by 6 is the average force in pounds required to deflect the door that distance.

As is known, where an intrusion beam is used in a door, a graph plotted of force versus displacement provides generally a characteristic curve. (See FIG. 13A)

The characteristic curve has three distinct sections. The curve begins with a linear slope which has been previously established to be dependent on the geometric bending stiffness of the beams and their end conditions. This is followed by a sharp change in the slope (first peak) which is due to the yielding, or more likely, plastic buckling of the central region of the beam. Finally the curve follows a somewhat lower slope in which post buckling deformations occur. The 6" displacement of the intruder usually includes these three sections. If the test is allowed to continue, the slope of the characteristic curve will change radically toward a steeper curve and ends when the beam fails. This final slope is mainly caused by the membrane stiffness of the tubes. FIG. 14 illustrates the deflection of a single tube when deformed by force F and in respect of which the curve in FIG. 13 applies.

It is a further object of the invention to provide an improved structural module which is easy to assemble and mount. Particularly in the past it has been difficult to mount hardware, raise and lower the window in the door, and still provide protection from side impact.

Further and other objects of the invention will be realized by those skilled in the art from the following summary of the invention and detailed description of an embodiment thereof.

SUMMARY OF THE INVENTION

According to one aspect of the invention a reinforcing structure for example a structural module (preferably a hardware cassette) is provided suitable for use in the assembly of a vehicle door, the reinforcing structure, for example the structural module, comprising preferably a mounting member (preferably a hinge mounting portion and in one embodiment a latch mounting portion) and load bearing members and preferably substantially hollow load bearing members, such as tubes, each load bearing member tube having two ends, preferably one end of each load bearing member or tube being connected to the preferred mounting member, preferably when at least three tubes are used a first tube being connected to the preferred mounting member and, a pair of laterally spaced load bearing members such as tubes preferably extending substantially in parallel planes and in one embodiment extending in a substantially parallel direction and preferably connected to the mounting member and preferably to the hinge mounting portion and preferably spaced from the first tube when at least three tubes are present. Thus, in essence, in simple terms the pair of laterally spaced load bearing members or tubes provide a reinforcing structure for the vehicle door providing progressive side impact strength.

According to another aspect of the invention a structural module (hardware cassette) is provided suitable for use in the assembly of a vehicle door, the structural module comprising a latch mounting member and load bearing members and preferably substantially hollow load bearing members, such as tubes, each load bearing member or tube having two ends, one end of each load bearing member tube being connected to the latch mounting member, a first load bearing member or tube connected to the latch mounting member and, spaced from the first load bearing member tube, a pair of laterally spaced load bearing members tubes preferably extending substantially in parallel planes and in one embodiment extending in a substantially parallel direction and connected to the latch mounting member.

According to another aspect of the invention there is provided a structural module (hardware cassette) suitable for use in the assembly of a vehicle door, the structural module comprising a latch mounting member, a pair of door hinge assembly components (a lower door hinge component and an upper door hinge component) vertically spaced from one another when mounted in a vehicle, and tubes (for example round 1½" tubes) connecting the hinge components to the latch mounting member, one tube (upper tube) connecting the upper hinge component to the latch mounting member and extending substantially horizontally from the upper hinge component to the latch mounting member when mounted in the vehicle and a pair of laterally spaced tubes preferably extending substantially in parallel planes and in one embodiment extending in a substantially parallel direction and (in one embodiment spaced 3" center to center) connected to the lower hinge component (for example by welding) and the latch mounting member.

In some embodiments the ends of the pair of the laterally spaced tubes are flattened prior to being connected to the hinge components and latch mounting member. The flattening provides assurance of the necessary deflection required for the correct performance of the structural module. Preferably the ends of the upper tube are not flattened for better load transmission as a belt reinforcement. In another embodiment, the ends of the tubes may be scalloped (cut on an angle) by conventional methods prior to the tubes being connected to the hinge components and latch mounting member. Preferably the upper tube is not scalloped. Any method of assuring providing the deflection of the tubes of the structural module will be acceptable such as scalloping or flattening as well or any other geometric weakening of the end of the tube which reduces the section modulous thereof.

Thus the basis of the design of the preferred structural module is a substantially triangular arrangement of tubes of closed cross-section (for example round, square) directly connecting the hinges to the latch mounting member which is preferably reinforced. In addition to providing a direct load path to the surrounding pillar structure in the case of a side, frontal, or rearward impact, the triangular arrangement provides the optimum stiffness for sag loadings.

A longitudinal tube runs from the upper hinge component to the latch mounting member and acts as an inner belt reinforcement. Two laterally spaced tubes preferably extending substantially in parallel planes and in one embodiment extending in a substantially parallel direction (for example round, square) are for example welded to the lower hinge component and pick up the latch reinforcement at the rear of the structural module. These tubes may be horizontally offset or spaced. The offset produces a progressive side impact strength. As the outer tube deflects when a force is applied to it, it passes the plane of extension and in one embodiment when the spaced tubes are substantially laterally parallel to one another contacts the inner tube and produces a compound bending section that continues to absorb the strain energy at a much higher rate. The wall thickness and diameter of all the tubes can be adjusted individually to produce the optimum design in terms of the strength to weight ratio of the structural module. The laterally spaced tubes also allow the window glass to drop between them.

With the door hinge components, the tubes acting as belt reinforcement and intrusion beams and the latch mounting member are incorporated into the structural module cassette, and it is possible to install it on a vehicle or fixture and to operate it as a door. This feature allows for more flexibility in terms of inner and outer door skin materials (for example plastic) since all the structural members of the door assembly are contained within the cassette.

All door hardware (window regulator and glass guidance, latch assembly, inner release handle assembly, lock knob assembly and door hinge halves) may be pre-installed on the structural module cassette and adjusted and tested on the cassette. The speaker, window regulator and inner release handle assembly may be carried on a single stamping, rolled section, plate or the like that is secured (for example welded) to the inner belt reinforcement (upper tube) and the inner laterally spaced tube.

A wiring harness for door electrical components including power mirror, window and lock, courtesy lamp and keyless entry system may be attached directly to the cassette. The door harness may be connected to the main wiring harness via a modular connector or connectors.

According to another aspect of the invention a vehicle door may be provided incorporating any of the structural modules as described. In some embodiments the door frame comprises a forward shut face carrying slots for the passage of hinge components therethrough.

The front of the cassette may be loaded into the door frame first and may be netted fore and aft to the inside surface of the door shut face. The forward portion of the window seal/glass guide may then be positioned between the parallel spaced tubes and may be secured to the inner tube via an adjustable bracket. The rear of the cassette may be netted cross car on the rear of the inner panel face. Transverse adjustment of the door assembly is provided by horizontal slots on the forward shut face of the door frame and an adjustable latch striker on the B-pillar. Vertical and fore/aft adjustment is provided by the body half of the door hinges attached to the A-pillar.

The inner trim panel may be attached to the door frame with the armrest attached directly to the inner intrusion tube. An inner pull handle may be attached to the belt reinforcement tube if required.

BRIEF DESCRIPTION OF THE DRAWINGS

The invention will now be illustrated with respect to the following drawings illustrating embodiments of the invention in which:

FIGS. 5 to 10 are close up views of parts of the car door shown in FIG. 3 with portions removed and in FIG. 7 showing an alternative latch mounting member configuration.

FIG. 11, 11c, 11f illustrate the deflection of the two spaced tubes forming part of a structural module of FIG. 1 and other similar embodiments by an applied Force (F) applied to the side of the outer tube.

FIGS. 11a and 11d illustrate tubes providing progressive side impact strength, in top and side view as an alternative to tubes 32, and 34 of FIG. 1 and illustrted in a preferred embodiment of the invention and parallel in top view but intersecting in side view.

FIGS. 11b and 11e illustrate tubes providing progressive side impact strength similar to FIGS. 11a, and 11d but converging in top view and intersecting in side view.

DETAILED DESCRIPTION OF PREFERRED EMBODIMENTS OF THE INVENTION

Figure 13:
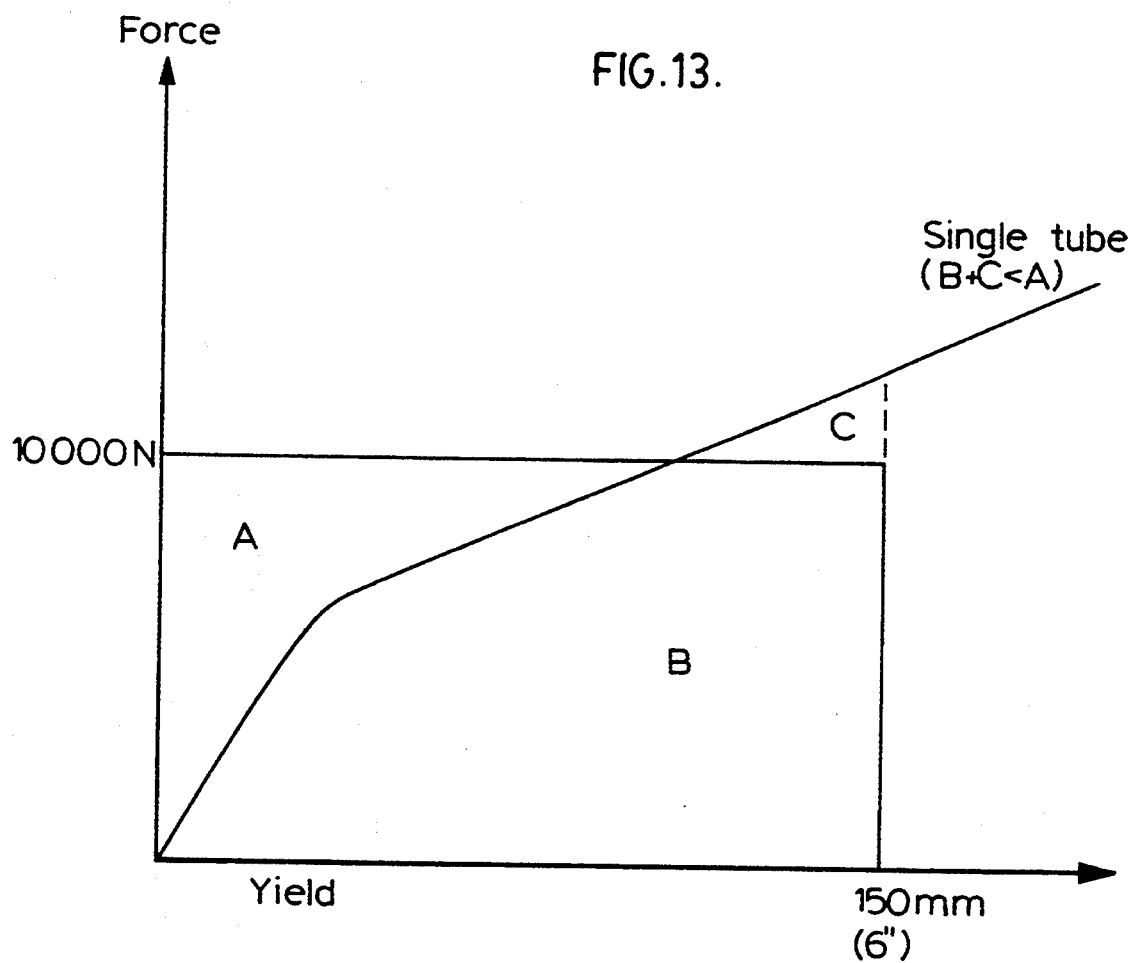
FIG. 13 is a performance graph for a known single intrusion device.

As is known where an intrusion beam is used in a door, a graph plotted of force versus displacement provides generally a characteristic curve. (See FIG. 13)

Figure 14:
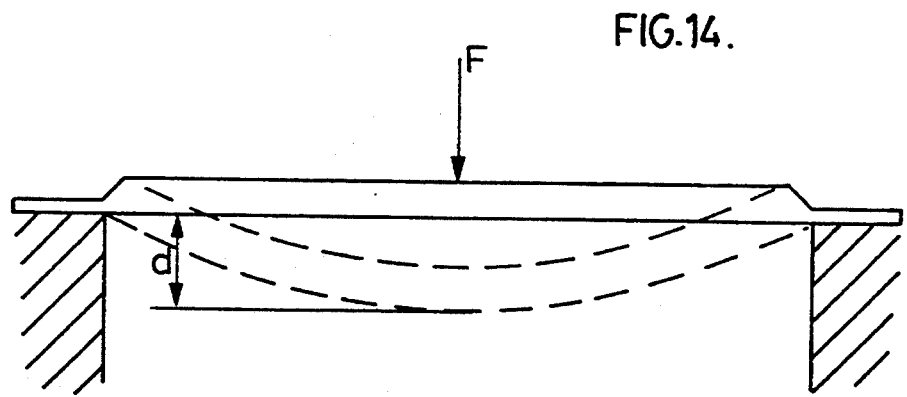
FIG. 14 is a side view schematic of the single intrusion device of FIG. 13.

The characteristic curve has three distinct sections. The curve begins with a linear slope which has been previously established to be dependent on the geometric bending stiffness of the beams and their end conditions. This is followed by a sharp change in the slope (first peak) which is due to the yielding, or more likely, plastic buckling of the central region of the beam. Finally the curve follows a somewhat lower slope in which post buckling deformations occur. The 6" displacement of the intruder usually includes these three sections. If the test is allowed to continue, the slope of the characteristic curve will change radically toward a steeper curve and ends when the beam fails. This final slope is mainly caused by the membrane stiffness of the tubes. FIG. 14 illustrates the deflection of a single tube when deformed by force F and in respect of which the curve in FIG. 13 applies.

Figure 1:
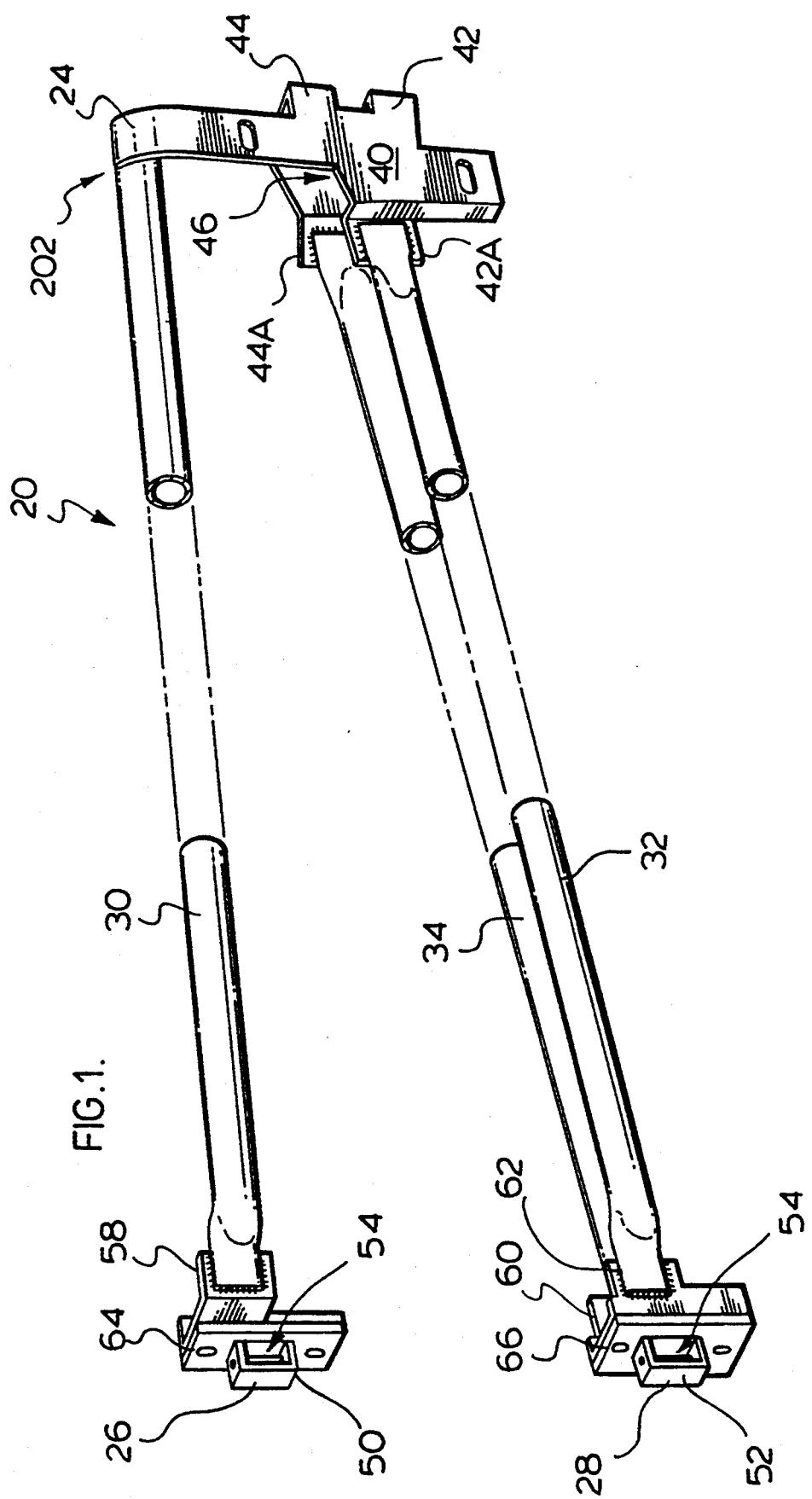
FIG. 1 is a perspective view of a structural module according to an embodiment of the invention.
Figure 3:
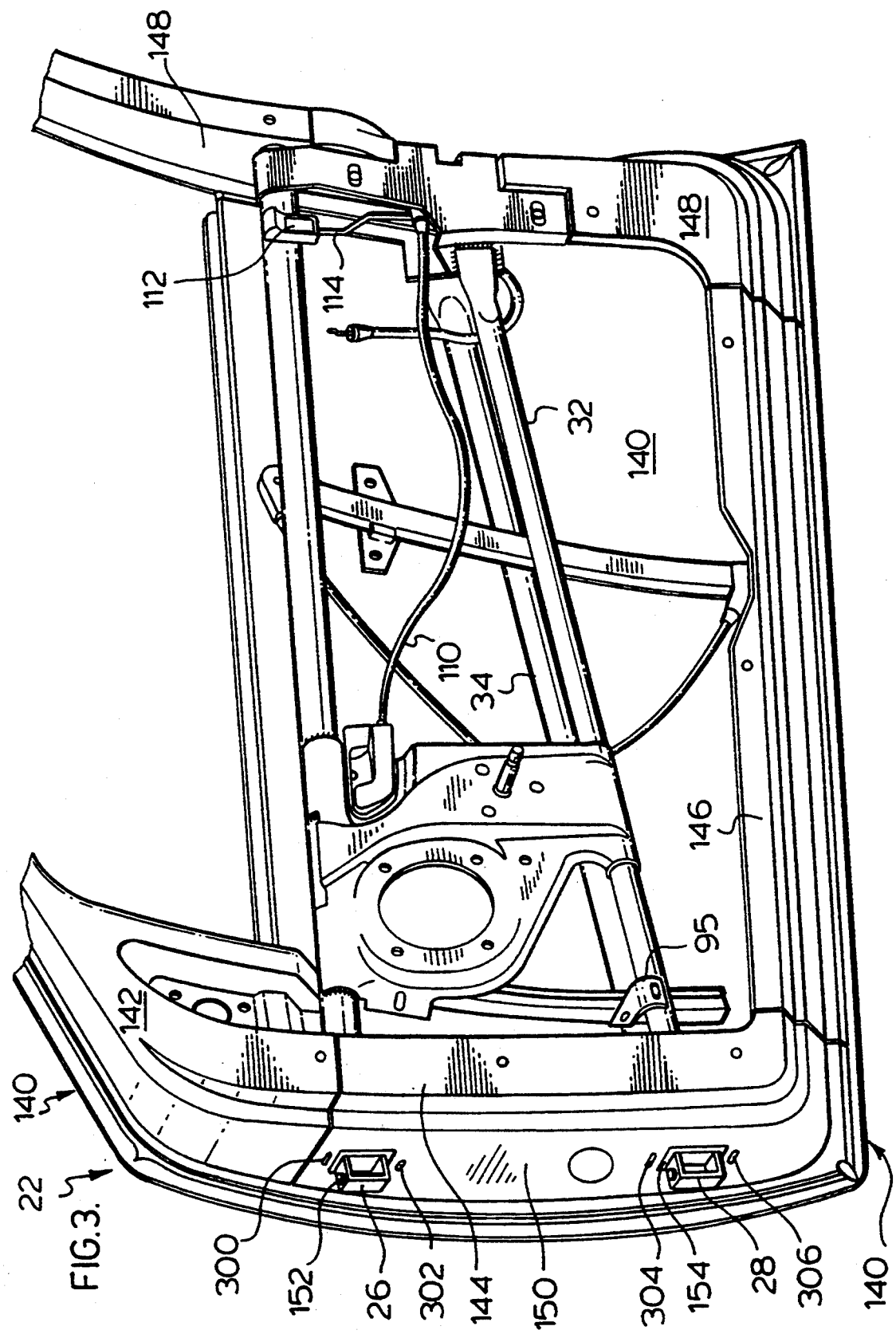
FIG. 3 is the modified structural module of FIG. 2 installed into a car door.

With reference to FIG. 1, there is shown structural module 20 suitable for use in the assembly of vehicle door 22 (see FIG. 3), structural module 20 comprising latch mounting member 24, a pair of door hinge components 26, 28 vertically spaced from one another when mounted on door 22 (lower door hinge component 28 and upper door hinge component 26) and straight round tubes (1½" diameter) 30, 32, 34 directly connecting hinge components 26, 28 to latch mounting member 24. Tube 30 connects upper hinge component 26 to latch mounting member 24 and extends substantially horizontally between the two components when mounted on vehicle door 22. A pair of laterally spaced preferably parallel tubes 32, 34 (spaced 3" from center to center) connect lower hinge component 28 and latch mounting member 24. In one embodiment the tubes are parallel in the top view only (as best seen in FIG. 11a) but appear to intersect in side view (as best seen in FIG. 11d) In other embodiments exemplified by FIG. 11b and 11c the laterally spaced tubes may be oriented to ultimately converge or diverge but remain effectively laterally spaced between the outer end edges of the vehicle door. To assist with the performance of the structural module tubes 32 and 34 have their ends flattened and welded to latch mounting member 24 and to arms 60 and 62 of plate 66 secured to hinge component 28 as shown. The flattening provides assurance of the necessary deflection required for the correct performance of the structural module. Any other method of assuring providing the deflection of the structural module will be acceptable as well, such as flattening, scalloping or any other geometric weakening of the tube ends which reduces the section modulous thereof. Tube 30 has only one end flattened. This end is connected (welded) to arm 58 of plate 64 secured to hinge component 26 as shown. The other unflattened end 202 is welded to latch mounting member 24.

Figure 4:
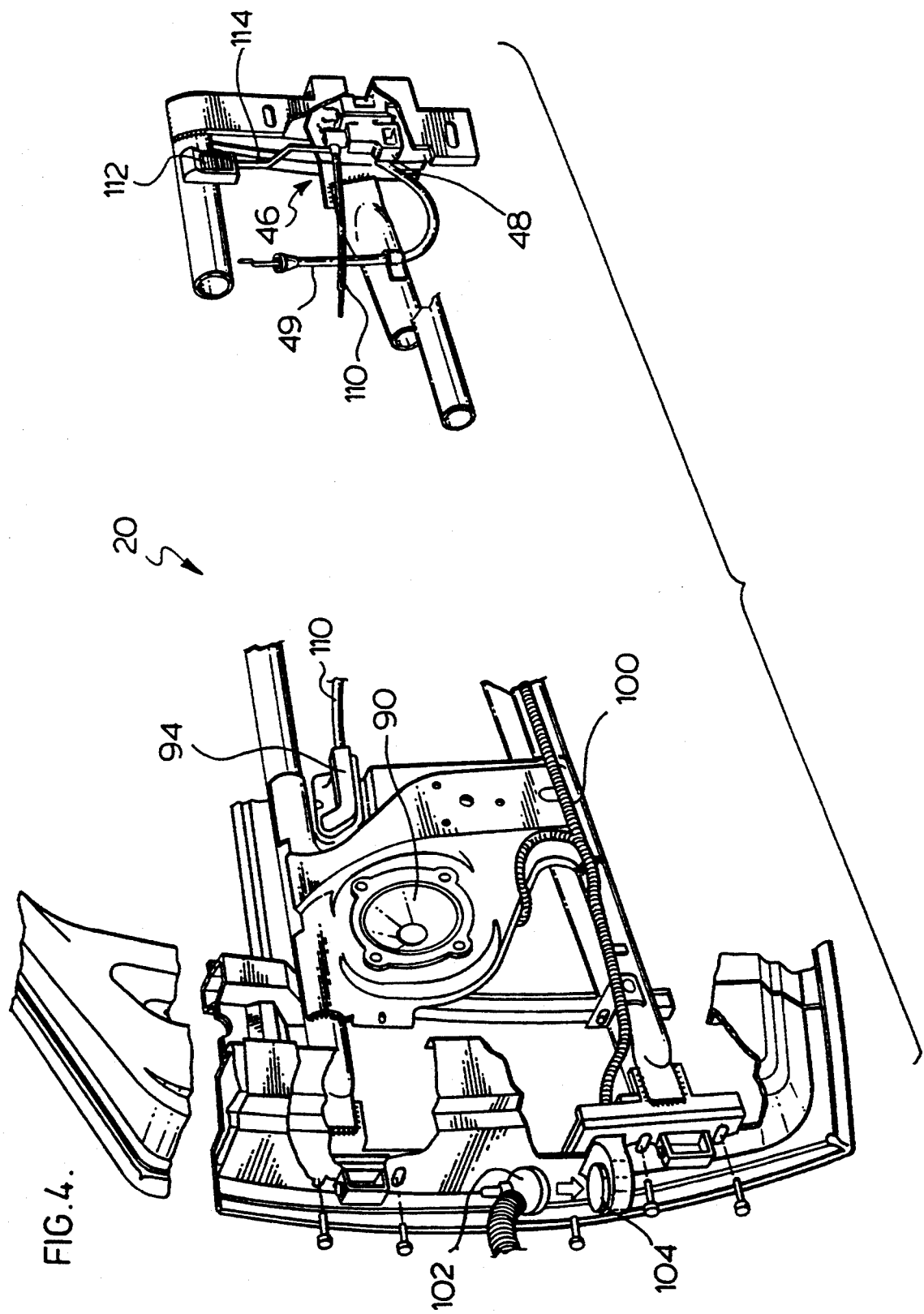
FIG. 4 is a view of part of the door of FIG. 3 with portions removed.

Latch mounting member 24 includes plate 40 comprising two spaced wrap around arms 42 and 44 bent to provide recess 46 for receiving and mounting latch mechanism 48 (see FIG. 4). The ends 42A and 44A of the arms 42 and 44 are welded to the ends of tubes 32 and 34. Each of hinge components 26 and 28 comprise brackets 50 and 52 through which pins 54 pass (for connecting to the hinge component on the A-pillar (not shown) of a vehicle).

As is apparent, structural module 20 is generally triangular in shape. In addition to providing a direct load path to the surrounding pillar structure of the vehicle (not shown) in the case of a side impact, this triangular arrangement provides optimum stiffness for sag loadings.

Figure 11:
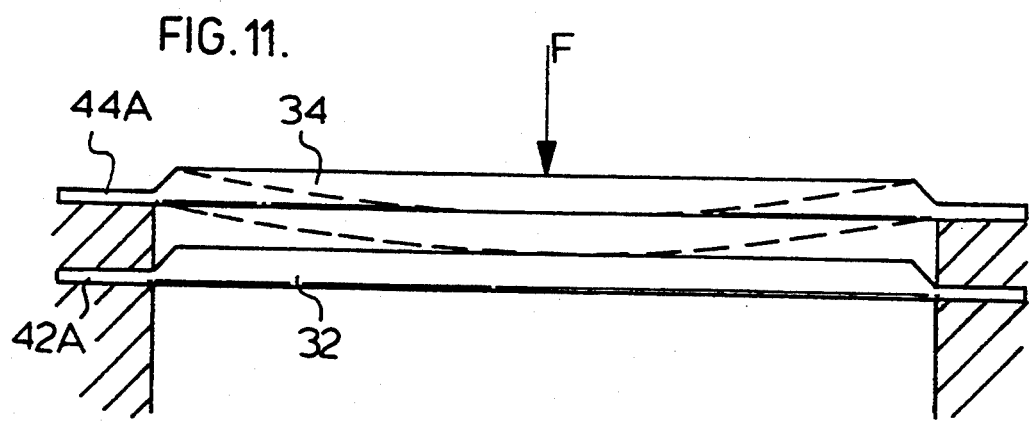
Figure 12:
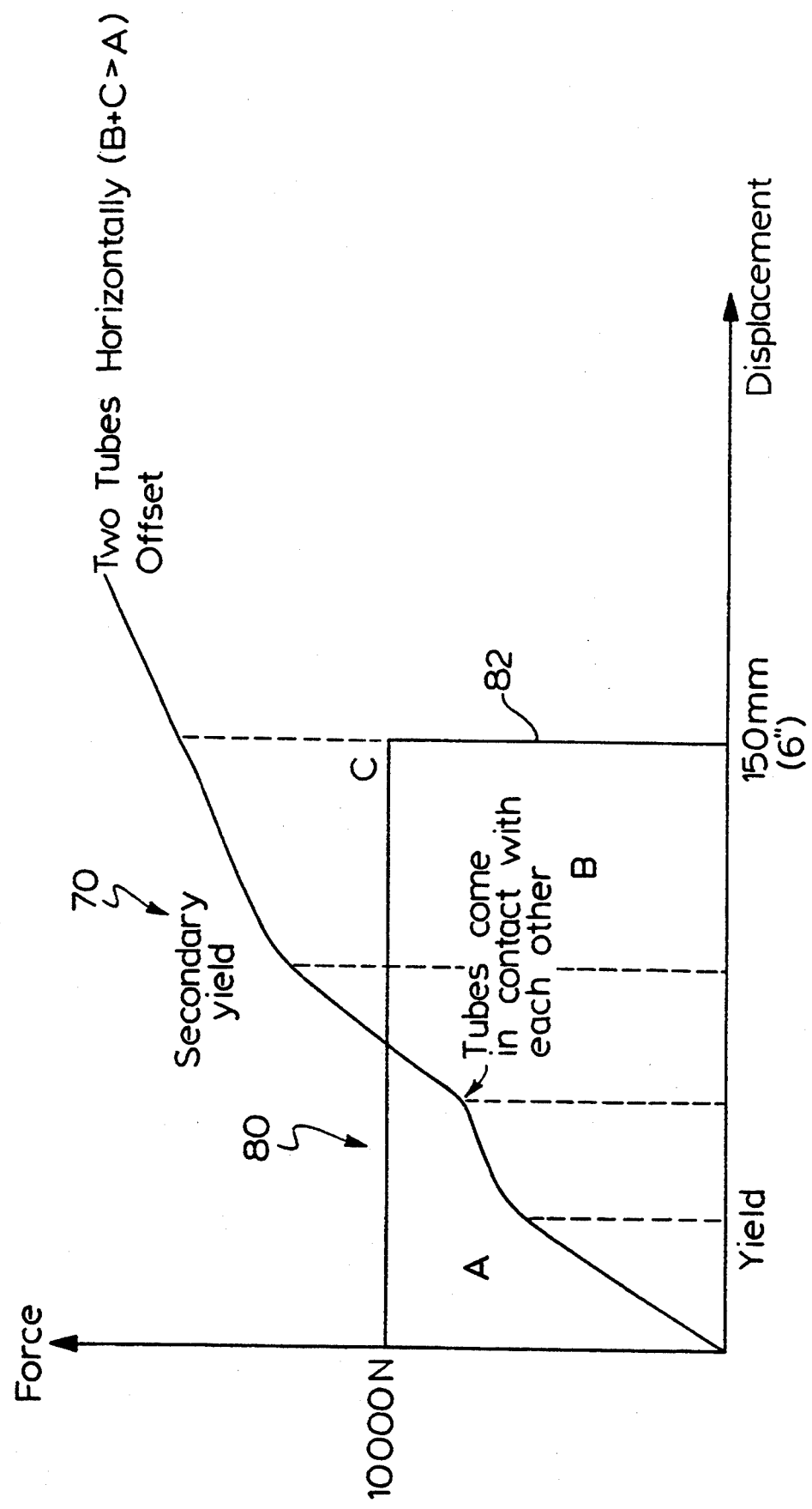
FIG. 12 illustrates the curve by plotting Force versus displacement when the specified Force (F) is applied to the side of the outer tube in FIG. 11.

The two parallel tubes 32, 34 are offset horizontally a distance of 3" center to center. This offset produces a progressive side impact strength. As the outer tube 34 deflects it in one embodiment as seen in FIG. 11 contacts inner tube 32 or as exemplified by FIGS. 11a, 11b, and 11c passes the vertical plane of extension of the inner tube without contacting the tube and produces a compound bending section that continues to absorb the impact strain energy at a much higher rate. The curve in FIG. 12 has the initial characteristics of the curve shown in FIG. 13 until tube 34 meets tube 32 shown in FIG. 11 or passes the vertical plane of extension of the inner tube as seen in relation to FIGS. 11a, through 11f. Thereafter the curve continues with a linear slope dependent on the geometric bending stiffness of the tubes together and their end conditions (for example flattened, unflattened and scalloped or the like). This is followed by a change in the slope at secondary yield at 70 which is due to the yielding or more likely, plastic buckling of the central regions to the tubes. Finally the curve follows a somewhat lower slope in which post buckling deformation occurs. Because the area of rectangle "A" made up by the sides 80 and 82 (see FIG. 12) is less than the areas of "B" & "C" under the curve, the initial crush phase of government safety standard Federal Motor Vehicle Safety Standard No. 571.214 is satisfied. As best seen in FIGS. 11, and 11 a–f, the laterally spaced tubes may be parallel as seen in FIG. 11, parallel in the vertical plane as seen in FIG. 11a or divergent as seen in FIG. 11b.

Figure 2:
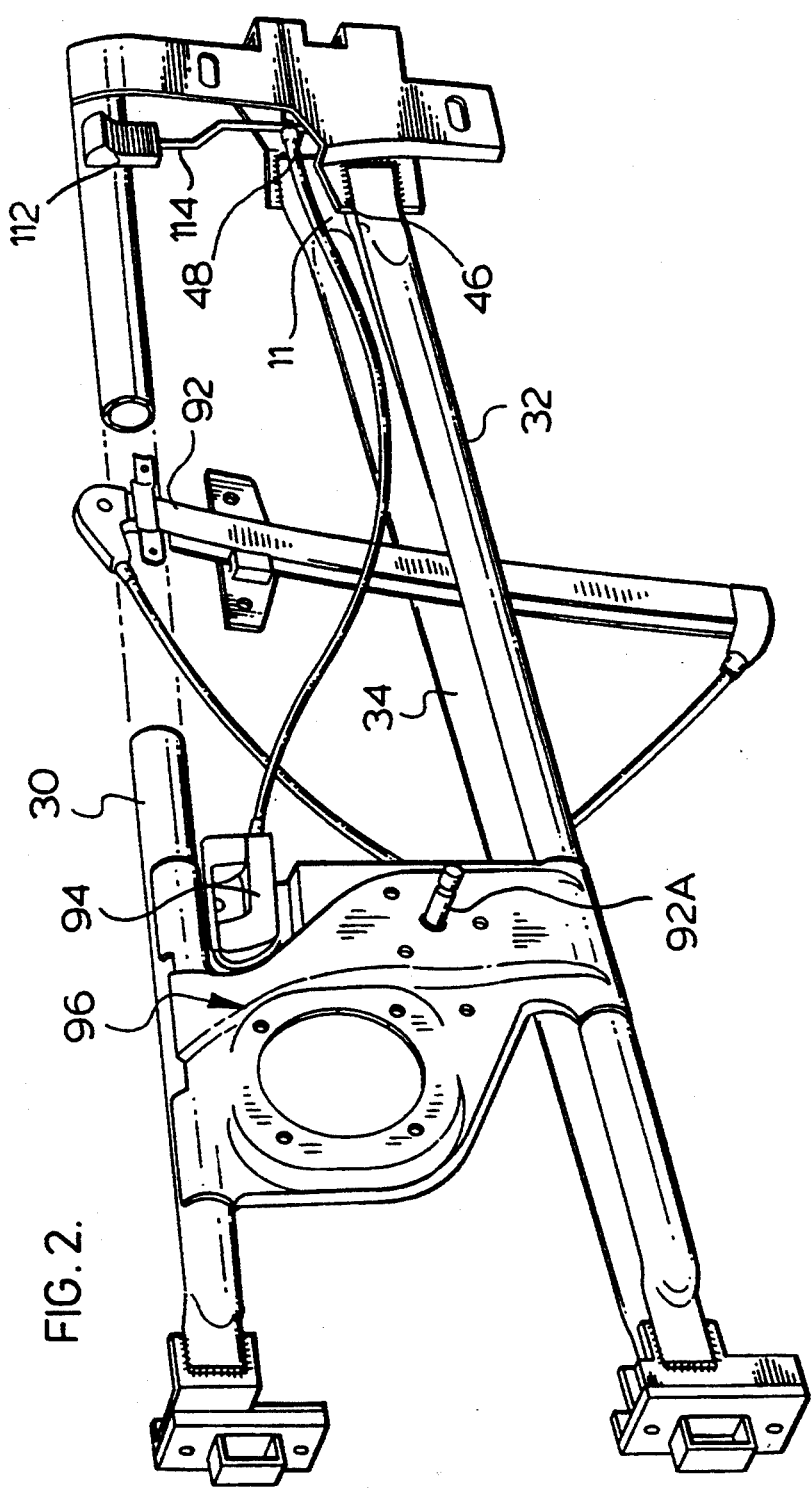
FIG. 2 is a perspective view of the structural module to which has been installed operational hardware.

All door hardware may be pre-installed on structural module cassette 20 (shown in FIG. 2). Tube 30 acts as an inner belt reinforcement. Speaker 90 (see FIG. 4), window regulator 92 with stem 92A to receive a handle (not shown), and inner release handle assembly 94 are carried on single stamping 96 welded to tube 30 and tube 32.

A complete wiring harness 100 (see FIG. 4) for all electrical components (including power mirror, window and lock, courtesy lamp and keyless entry system) is attached directly to the cassette 20. The door harness 100 is connected to the main wiring harness 102 in a single modular connector 104. The latch mechanism 48 mounted in recess 46 carries cable 49 leading to the outside release handle for outside release. Inner release handle assembly 94 is connected to latch mechanism 48 via cable 110. Lock knob 112 is attached to latch mechanism 48 by rod 114.

Window regulator 92 carries a glass window which like regulator 92 is positioned between tubes 32 and 34.

Pre-assembled structural module is then installed into door 22. In this regard (with reference to FIGS. 3 and 4) door 22 comprises outer skin 140, frame components 142, 144, 146 and 148 comprising door shut faces, for example face 150 of component 144. Face 150 comprises two openings 152 and 154 for passing hinge components 26 and 28 through the door for connection to hinge components on the A-pillar.

The front of the cassette may be loaded into the door frame first and may be netted fore and aft to the inside surface of the door shut face. The forward portion of the window seal/glass guide may then be positioned between the parallel tubes and is secured to the inner tube 32 via an adjustable bracket 95 (see FIG. 3). The rear of the cassette may be netted cross car on the rear of the inner panel face 148. Transverse adjustment of the door assembly is provided by horizontal slots 300, 302, 304 and 306 (see FIG. 3) on the forward shut face 150 of the door frame member 144 and an adjustable latch striker (not shown). Vertical and fore/aft adjustment is provided by the body half of the door hinges (not shown).

With reference to FIGS. 5 to 10 inclusive, cross-sections through door assembly 22 and components of structural module 20 (and a modification thereto) exposing the different cross-sections and door reinforcing portions (shown in dark) are shown.

Figure 5:
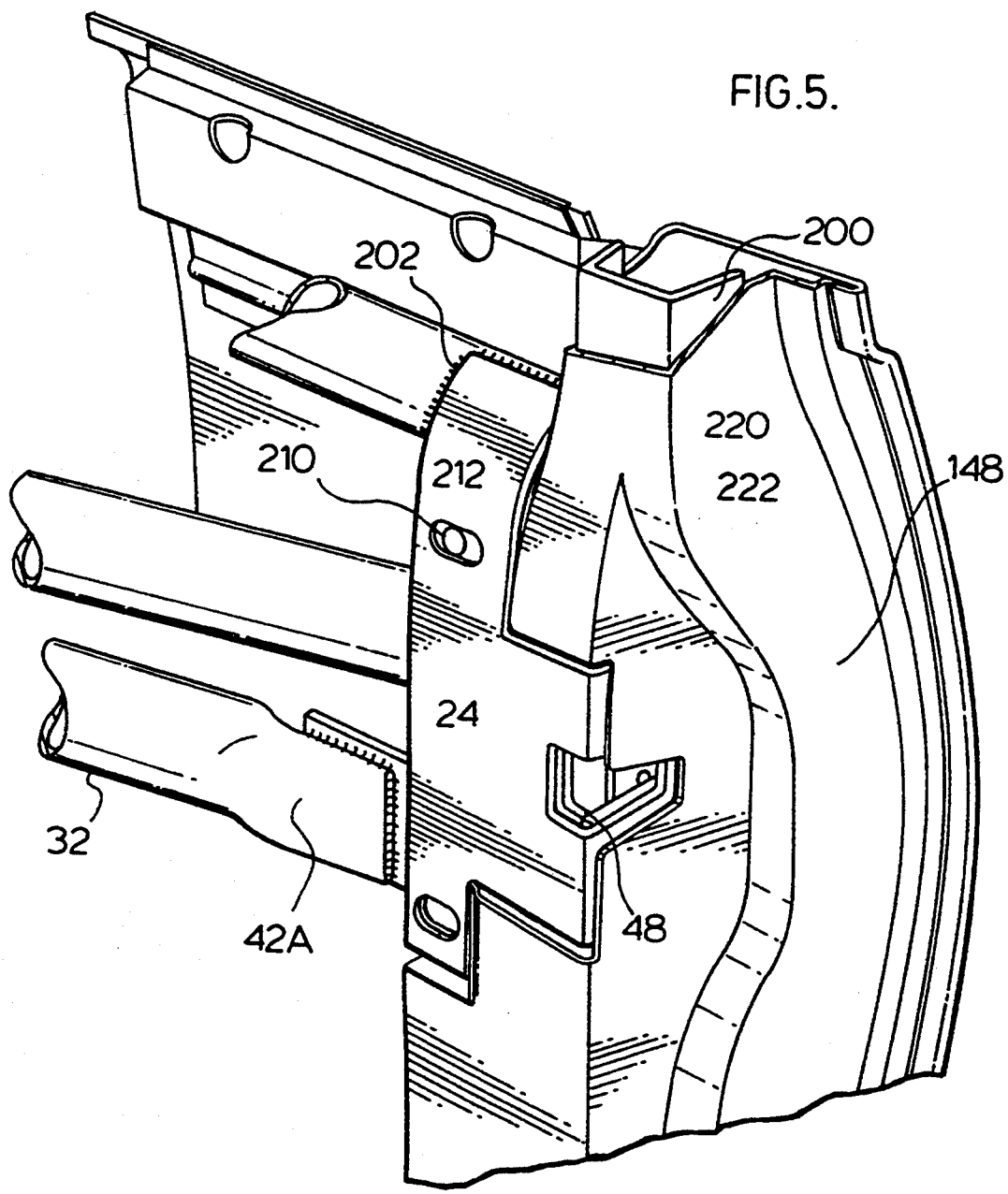
Figure 6:
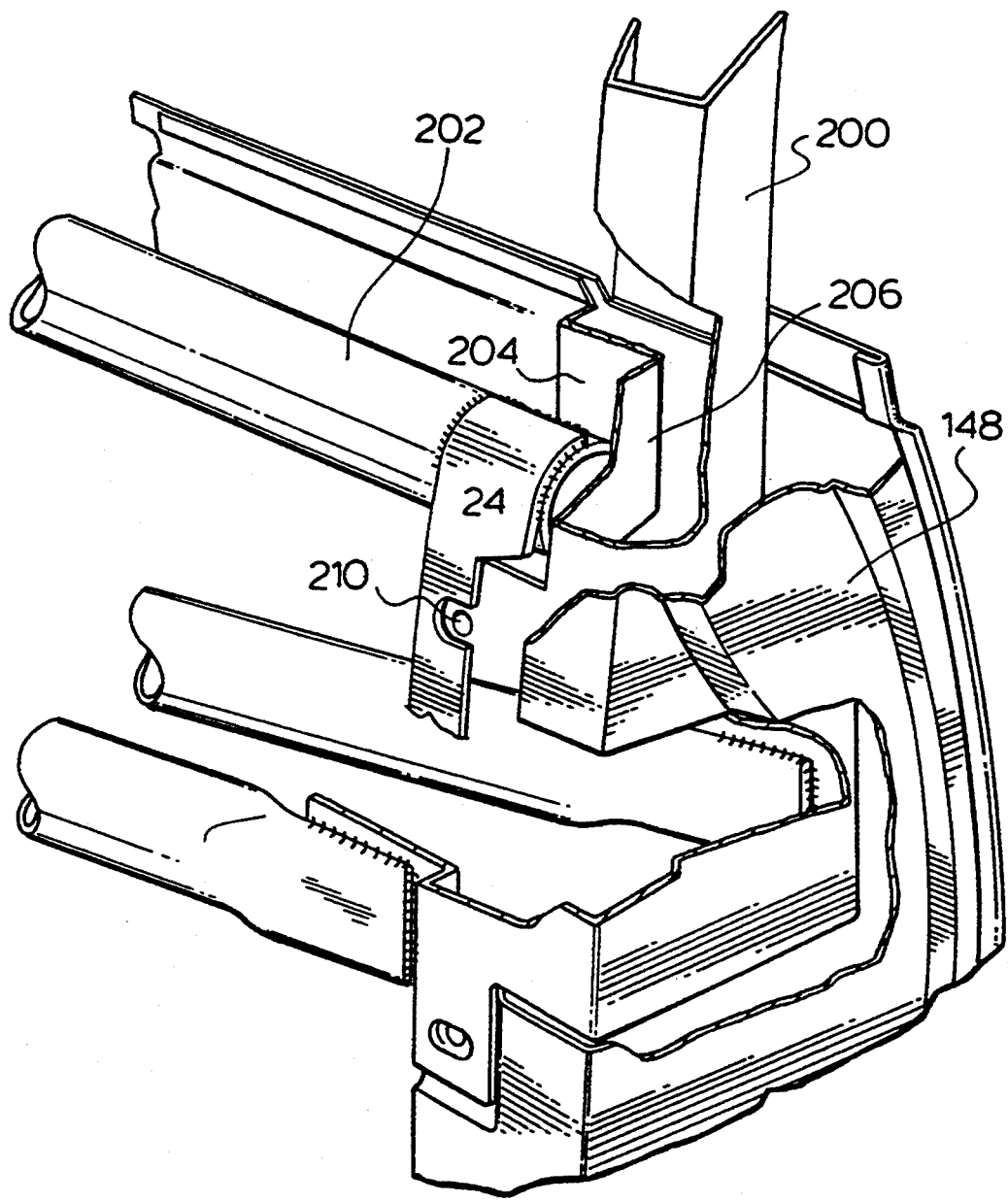

Particularly with reference to FIGS. 5 and 6 structural reinforcement has been added to the door. In this regard reinforcing stamped steel "C" section 200 is interposed between door member 148 and the longitudinal unflattened end 202 of tube 30. In this regard the end 202 of tube 30 sits in recess 204 of member 200 and abuts wall portion 206. Thus any load transmitted along tube 30 is transmitted into reinforcing section 200 which contacts door member 148 which is forced into "B" pillar (not shown) in a frontal collision transmitting the forces into the "B" pillar. Thus section 200 acts as a stiffener. Section 200 is connected by a fastener 210 passing through slotted aperture 212 of latch mounting member 24 and an aperture, not shown, through section 200. A metal tab extending from member 148 extends between latch mounting member 24 and section 200. Door member 148 is spot welded to section 200 at the "X"s as at 220 and 222.

Thus by adding stiffener 200 and fastening structural module 20 thereto, not only is the longitudinal and sag strength of the door increased, but also side impact load strength.

With reference to FIG. 7, structural module 20' is shown (in part) substantially the same as structural module 20 except that latch mounting member 24' replaces latch mounting member 24. Member 24' is broader and stronger.

FIG. 8 illustrates the car door 22 partly in section looking from the outside. Tube 30 supports interior door trim panel 230 attached by a fastener extending under the tube (for example a snap fastener or clip) as at 232. Window seal 234 is attached to the inner trim panel 230 by hook portion 236 sandwiched between tube 30 and inner trim panel 230. Further reinforcement of the door is shown at 238 and 240. Reinforcement 240 reinforces the upper hinge component 26 in the form of a "C" section welded in the door. Reinforcement 238 in the form of a "C" section stiffens the window frame.

With reference to FIG. 9, a cut away view of the door, tube 30 is shown welded to plate assembly 64 to which hinge component 26 is welded through rectangular openings 246 and 248. Plate 64 is welded to reinforcement member 240. While in this embodiment tube 30 is flattened at its end connected to plate assembly 64 prior to welding to plate assembly 64, the tube end may not be flattened but left round for better transmission of the longitudinal forces as a result of a frontal or rearward crush.

Figure 10:
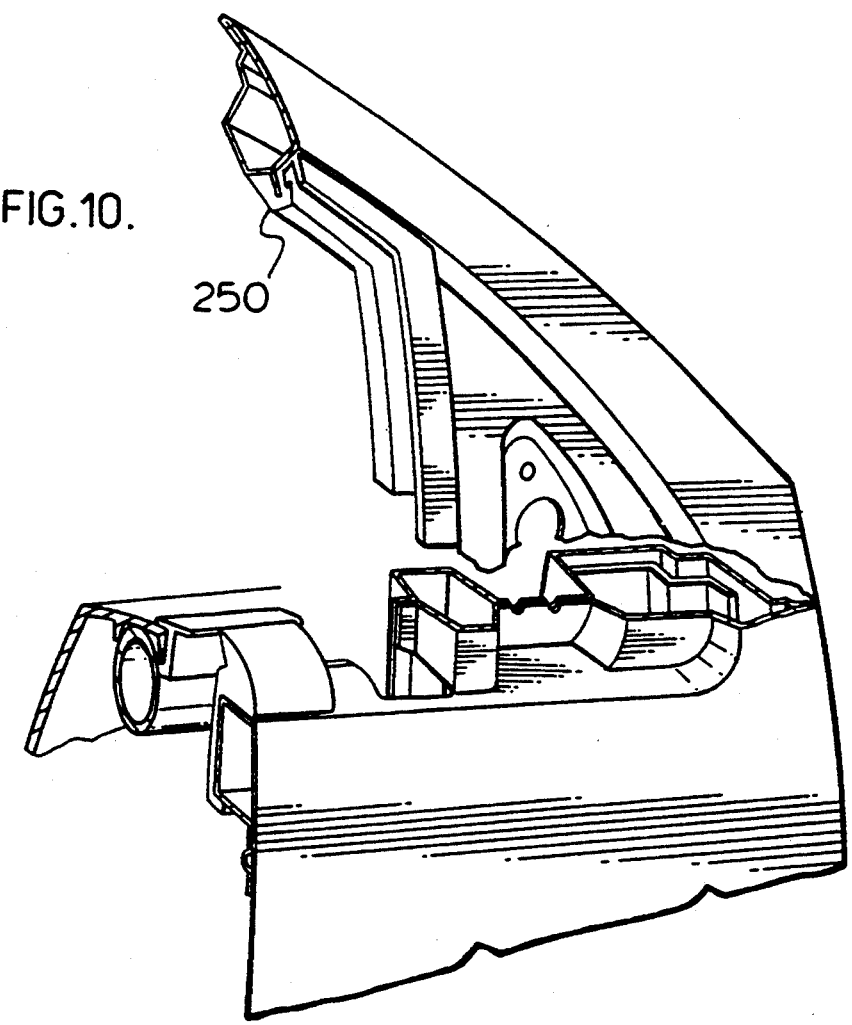

FIG. 10 highlights the upper seal section of the window at 250.

As many changes can be made to the various embodiments of the invention without departing from the scope of the invention; it is intended that all material contained herein by interpreted as illustrative of the invention and not in a limiting sense.

The embodiment of the invention in which an exclusive property or privilege is claimed are as follows:

1. A structural module is provided suitable for use in the assembly of a vehicle door, the structural module comprising a latch mounting member and tubes, each tube having two ends, one end of each tube being connected to the latch mounting member, a first tube of said tubes being connected to the latch mounting member and, spaced from the first tube, a pair of laterally spaced tubes of said tubes being connected to the latch mounting member, providing a reinforcing structure for the vehicle door providing progressive side impact strength.

2. The structural module of claim 1 wherein the pair of laterally spaced tubes extend substantially in parallel planes.

3. The structural module of claim 1 wherein the pair of laterally spaced tubes extend in a substantially parallel direction.

4. The module of claim 1, 2 or 3 wherein ends of the pair of the laterally spaced tubes are flattened prior to being connected to the latch mounting member.

5. The module of claim 1, 2, or 3 wherein the ends of the first tube remain unflattened.

6. The module of claim 1, 2 or 3 wherein the ends of the tubes connected to the latch mounting member remain unflattened.

7. A structural module suitable for use in the assembly of a vehicle door, the structural module comprising a latch mounting member, a pair of door hinge assembly components including a lower door hinge component and an upper door hinge component vertically spaced from one another when mounted in a vehicle, and tubes connecting the hinge components to the latch mounting member, one tube of said tubes connecting the upper hinge component to the latch mounting member and extending substantially horizontally from the upper hinge component to the latch mounting member when mounted in the vehicle and a pair of laterally spaced tubes of said tubes being connected to the lower hinge component and the latch mounting member, providing a reinforcing structure for the vehicle door providing progressive side impact strength.

8. The structural module of claim 7 wherein the laterally spaced tubes extend substantially in parallel planes.

9. The structural module of claim 7 wherein the laterally spaced tubes extend in a substantially parallel direction.

10. The module of claim 7, 8, or 9 wherein the ends of the pair of the laterally spaced tubes are flattened prior to being connected to the hinge components and latch mounting member.

11. The module of claim 7, 8 or 9 wherein the ends of the upper tube remain unflattened for better load transmission.

12. The module of claim 7, 8 or 9 wherein the end of the upper tube connected to the latch mounting member remains unflattened.

13. A structural module suitable for use in the assembly of a vehicle door comprising an upper and lower hinge component, a latch mounting member, and an arrangement of tubes directly connecting the hinge components to the latch mounting member thereby providing, a direct load path to the vehicle in the case of longitudinal crush, and side impact, and optimum stiffness for sag loading, wherein two laterally spaced tubes, each having a plane of extension, are connected to the lower hinge component, and the latch mounting member, the laterally spaced tubes being horizontally spaced, providing a reinforcing structure for the vehicle door providing progressive side impact strength.

14. The module of claim 13 comprising a longitudinal tube running from the upper hinge component to the latch member and acting as an inner belt reinforcement.

15. The module of claim 13 wherein the spaced tubes produce a progressive side impact strength as the outer tube deflects and passes the plane of extension of the inner tube and produces a compound bending section that continues to absorb strain energy at a much higher rate.

16. The structural module of claim 15 wherein the spaced tubes are substantially laterally parallel to one another and the outer tube contacts the inner tube as the outer tube deflects and passes the plane of extension of the inner tube.

17. The module of any of claims 1, 7 or 13 inclusive further comprising door hardware pre-installed on the structural module.

18. The module of claim 17 further comprising a speaker, window regulator, and inner release handle wherein the speaker, window regulator and inner release handle assembly are carried on a single stamped rolled section plate that is attached to the single tube and the inner tube of the pain of spaced parallel tubes.

19. A vehicle door comprising a door frame and a structural module, the structural module comprising a latch mounting member, a pair of door hinge assembly components including a lower door hinge component and an upper door hinge component spaced from one another when mounted in a vehicle, and tubes connecting the pair of door hinge assembly components to the latch member, one tube of said tubes connecting the upper door hinge component to the latch mounting member and extending substantially horizontally from the upper door hinge component to the latch mounting member when mounted in the vehicle and a pair of laterally spaced tubes connected to the lower door hinge component and the latch mounting member and the door frame having a forward shut face carrying slots for the passage of the hinge assembly components therethrough, providing a reinforcing structure for the vehicle door providing progressive side impact strength.

20. The door of claim 19 wherein the ends of the pair of the laterally spaced tubes are flattened prior to being connected to the hinge components and latch mounting member.

21. The door of claim 19 or 20 wherein the ends of the upper tube remain unflattened for better load transmission.

22. The door of claim 19 or 20 wherein the end of the upper tube connected to the latch mounting member remains unflattened.

23. The door of any of claims 19 to 22 inclusive further comprising door hardware pre-installed on the module.

24. The door of claim 23 further comprising a speaker, window regulator, and inner release handle wherein the speaker, window regulator and inner release handle assembly are carried on a single stamped rolled section plate that is attached to the upper tube and the inner tube of the pair of spaced parallel tubes.

25. The module of any of claims 1, 7 or 13 inclusive wherein ends of tubes are contoured.

26. The door of claims 19, 23 as it depends from 19, or 24 inclusive wherein the ends of tubes are contoured.

27. A reinforcing structure suitable for use in a vehicle door, the reinforcing structure comprising a pair of laterally spaced tubes spanning from proximate the front to proximate the rear of the door providing a reinforcing structure for the vehicle door providing progressive side impact strength.

28. A reinforcing structure suitable for use in a vehicle door, the reinforcing structure comprising a mounting member and tubes spanning from proximate the front to proximate the rear of the door, each tube having two ends, a pair of the tubes being laterally spaced, one end of each tube being connected to the mounting member.

29. The reinforcing structure of claim 28 wherein said structure is a structural module for use in the assembly of a vehicle door.

30. The reinforcing structure of claim 29 further comprising structural members wherein said structural module is a cassette wherein the structural members of the door assembly are contained within the cassette.

31. The structure of claim 28, 29 or 30 wherein said mounting member further comprises a hinge mounting portion.

32. The structure of claim 28, 29 or 30 wherein said mounting member further comprises a latch mounting portion.

33. The structure of claim 31 further comprising a latch mounting portion as a second mounting member.

34. The structure of claim 28, 29 or 30 wherein at least three tubes are used, a first tube being connected to the mounting member and spaced from the pair of laterally spaced tubes.

35. The structure of claim 31 wherein at least three tubes are used, a first tube being connected to the mounting member and spaced from the pair of laterally spaced tubes.

36. The structure of claim 34 wherein said mounting member includes a hinge mounting portion.

37. The structure of claim 35 wherein said mounting member includes a hinge mounting portion.

38. The structure of claim 28, 29 or 30 wherein said pair of the tubes being laterally spaced extend substantially in parallel planes.

39. The structure of claim 33 wherein said pair of the tubes being laterally spaced extend substantially in parallel planes.

40. The structure of claim 34 wherein said pair of the tubes being laterally spaced extend substantially in parallel planes.

41. The structure of claim 35 wherein said pair of the tubes being laterally spaced extend substantially in parallel planes.

42. The structure of claim 28, 29 or 30 wherein said pair of the tubes being laterally spaced extend in a substantially parallel direction.

43. The structure of claim 33 wherein said pair of the tubes being laterally spaced extend in a substantially parallel direction.

44. The structure of claim 34 wherein said pair of the tubes being laterally spaced extend in a substantially parallel direction.

45. The structure of claim 35 wherein said pair of the tubes being laterally spaced extend in a substantially parallel direction.

46. The structure of claim 28 further comprising a vehicle door having outer end edges wherein the laterally spaced tubes are oriented to ultimately converge or diverge but remain effectively laterally spaced between the outer end edges of the vehicle door.

47. The structure of claim 29 further comprising a vehicle door having outer end edges wherein the laterally spaced tubes are oriented to ultimately converge or diverge but remain effectively laterally spaced between the outer end edges of the vehicle door.

48. The structure of claim 30 further comprising a vehicle door having outer end edges wherein the laterally spaced tubes are oriented to ultimately converge or diverge but remain effectively laterally spaced between the outer end edges of the vehicle door.

49. The structure of claim 34 wherein the laterally spaced tubes are oriented to ultimately converge or diverge but remain effectively laterally spaced within the vehicle door.

50. The structure of any of claims 46 to 49 wherein the laterally spaced tubes are substantially parallel in the top view only.

51. The structure of claim 32 wherein at least three tubes are used, a first tube being connected to the mounting member and spaced from the pair of laterally spaced tubes.

52. The structure of claim 33 wherein at least three tubes are used, a first tube being connected to the mounting member and spaced from the pair of laterally spaced tubes.

53. A structural module is provided suitable for use in the assembly of a vehicle door, the structural module comprising a latch mounting member and load bearing members, each load bearing member having two ends, one end of each load bearing member being connected to the latch mounting member, a first load bearing member of said load bearing members being connected to the latch mounting member and, spaced from the first load bearing member, a pair of laterally spaced load bearing members of said load bearing members being connected to the latch mounting member, providing a reinforcing structure for the vehicle door providing progressive side impact strength.

* * * * *